US012688044B2

(12) United States Patent　　　　(10) Patent No.:　US 12,688,044 B2
Gago Alonso et al.　　　　　　　　　(45) Date of Patent:　　　Jul. 21, 2026

(54) DEVICE FOR PERFORMING BRANCH TARGET BUFFER ENTRY PREFETCHING

(71) Applicant: Microsoft Technology Licensing, LLC, Redmond, WA (US)

(72) Inventors: Julio Gago Alonso, Barcelona (ES); Santiago Galan, Molins de Rei (ES); Ivan Pizarro, Hospitalet de Llobregat (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 18/374,374

(22) Filed: Sep. 28, 2023

(65) Prior Publication Data

US 2025/0110745 A1　　Apr. 3, 2025

(51) Int. Cl.
G06F 9/38　　　　(2018.01)
(52) U.S. Cl.
CPC .......... G06F 9/3808 (2013.01); G06F 9/3806 (2013.01); *G06F 9/3844* (2013.01)
(58) Field of Classification Search
None
See application file for complete search history.

(56) References Cited

U.S. PATENT DOCUMENTS

2013/0332712 A1* 12/2013 Bonanno ............... G06F 9/3802
　　　　　　　　　　　　　　　　　　712/238
2013/0339694 A1* 12/2013 Bonanno ............. G06F 9/30145
　　　　　　　　　　　　　　　　　　712/238

2017/0090935 A1　 3/2017 Falsafi
2019/0303160 A1* 10/2019 Greenhalgh .......... G06F 9/3806
2022/0100666 A1*　3/2022 Ishii ...................... G06F 9/3806
2024/0020237 A1*　1/2024 Ishii ...................... G06F 9/3844

OTHER PUBLICATIONS

Rakesh Kumar, Cheng-Chieh Huang, Boris Grot, Vijay Nagarajan, "Boomerang: a Metadata-Free Architecture for Control Flow Delivery", May 8, IEEE, pp. 493-504 (Year: 2017).*
Ali Ansari, Pejman Lotfi-Kamran, and Hamid Sarbazi-Azad, "Divide and Conquer Frontend Bottleneck", Sep. 2023, ACM, pp. 65-78 (Year: 2020).*
International Search Report Received in PCT Application No. PCT/US2024/042599, mailed on Nov. 20, 2024, 15 pages.

(Continued)

*Primary Examiner* — Courtney P Spann
(74) *Attorney, Agent, or Firm* — Schwegman Lundberg & Woessner, P.A.

(57)　　　　　　ABSTRACT

A branch prediction device includes a hierarchy of successively slower to access branch target buffers that store branch target buffer entries identifying branch instructions, branch prediction circuitry configured to predict future branch instructions, and a branch target buffer prefetch table coupled to receive candidate entries corresponding to predicted future branch instruction branch target buffer misses, each entry of the candidate entries corresponding to a precursor branch instruction, and to receive predicted precursor branch instructions that trigger promotion of an entry in a branch target buffer of the branch target buffers to a faster branch target buffer of the branch target buffers.

10 Claims, 7 Drawing Sheets

(56)                    References Cited

OTHER PUBLICATIONS

Kumar, et al., "Shooting Down the Server Front-End Bottleneck", ACM Transactions on Computer Systems (TOCS), vol. 38, Issue 3-4, Jan. 4, 2022, pp. 1-30.

Song, et al., "Thermometer: profile-guided btb replacement for data center applications", ISCA '22: Proceedings of the 49th Annual International Symposium on Computer Architecture, Jun. 11, 2022, pp. 742-756.

International Preliminary Report on Patentability (Chapter I) Received for PCT Application No. PCT/US2024/042599, mailed on Apr. 9, 2026, 09 Pages.

* cited by examiner

600

610

TRACK BRANCH PREDICTION
STEPS IN TRACE LIST

620

SELECT PRECURSOR STEP IN
RESPONSE TO ENCOUNTERING ENTRY
MISSING FROM ALL BUT THE LAST BTB

630

ADD CANDIDATE ENTRY
TO BTB PREFETCH TABLE

640

ENCOUNTER PRECURSOR STEP

650

IDENTIFY BTB ENTRY

660

PROMOTE BTB ENTRY TO FASTER LEVEL

DEVICE FOR PERFORMING BRANCH TARGET BUFFER ENTRY PREFETCHING

BACKGROUND

In computing, processor pipeline designs benefit from trying to predict which next instruction will likely be executed following execution of a current instruction. Execution of the current instruction may result in a branch to one of two or more next instructions. Instruction branch speculation is used to determine the most likely next instruction, referred to as a target instruction.

Pipeline designs split computing operations into stages. Each stage is typically performed by dedicated hardware. An example computing pipeline includes stages (i) fetching an instruction, (ii) reading the instruction, (iii) decoding the instruction, (iv) executing the decoded instruction, (v) accessing memory to read operands from memory, and (vi) writing the results to the memory. Each of the stages relies on output of the prior stage to perform its operation. Instead of waiting for a first instruction to go through the entire pipeline, a next instruction begins to go through the pipeline before the first instruction is through the pipeline.

Traditionally, branch speculation is achieved by predicting the target of branches. Such targets can be fixed, for unconditional direct branches, variable, for indirect branches, dual (taken, non-taken), for conditional branches, or a combination of fixed, dual, or variable, when the instruction set architecture supports them.

To perform such prediction, different algorithms exist, which use dedicated storage (typically named Branch Target Buffers (BTBs)) to remember key details about branch location, type, and potential targets. Traditionally, performance is achieved by increasing the accuracy of such prediction. However, in certain workloads, capacity is also important, which is the ability to track and anticipate a large working set of branches, not necessarily difficult to predict with accuracy. The storage to track branches is typically made of several levels, with each level comprising several entries that outnumber, but are also slower than, the previous level. Increasing the storage capacity of branch prediction structures usually impacts the latency required to resolve such branches, which has an impact on performance.

SUMMARY

A branch prediction device includes a hierarchy of successively slower to access branch target buffers that store branch target buffer entries identifying branch instructions, branch prediction circuitry configured to predict future branch instructions, and a branch target buffer prefetch table coupled to receive candidate entries corresponding to predicted future branch instruction branch target buffer misses, each entry of the candidate entries corresponding to a precursor branch instruction, and to receive predicted precursor branch instructions that trigger promotion of an entry in a branch target buffer of the branch target buffers to a faster branch target buffer of the branch target buffers.

DETAILED DESCRIPTION

Figure 1:
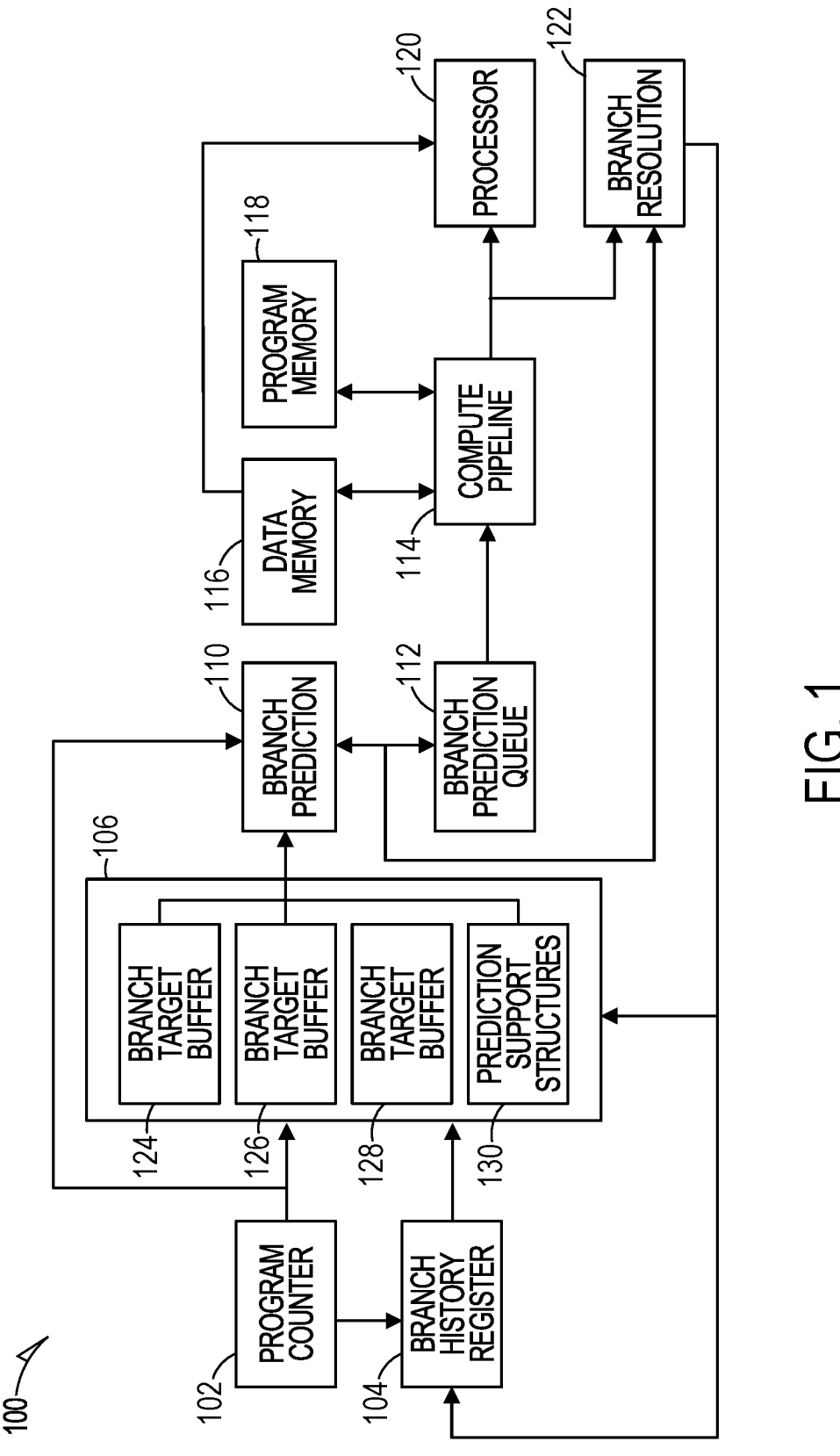
FIG. 1 is a block diagram of a system 100 for branch target prediction according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An improved system anticipates branch prediction entries required for future branch predictions and ensures such entries are brought to smaller and faster cache storage levels, such as branch target butters (BTB) that are dedicated to storing branch prediction entries. Patterns of sequences of (BTB) entries accessed by branch prediction circuitry are detected. The patterns are then used to prefetch entries before they are accessed again by the branch prediction circuitry. Reducing a latency of access to such branch prediction entries, even by a few cycles, can result in a substantial increase in performance.

To identify such patterns, existing branch predictors (sometimes called branch prediction circuitry) are leveraged. A trace or chain of recent activities by a branch predictor is stored and used when a benefit to registering a new prefetch is found. This benefit is observed when a BTB entry, used for predicting branches, is found to be present only in a slower-to-access level of the BTB hierarchy, which is frequent, since the slower levels are typically the largest, but also the slowest. Optionally, if a BTB victim cache is used, then another opportunity for prefetching is observed when a request to fill a BTB with an entry from the BTB victim cache is triggered. The BTB victim cache is used to receive BTB entries that are evicted from other BTBs in the system and will be described in further detail below.

When a benefit to prefetching a BTB entry is found, the trace of recent activities by the branch predictor is used to find a precursor step (a step representing a branch prediction occurring prior to the current BTB having the benefit) in the chain of predictions. The found precursor step is used as a trigger for the prefetch. Two outcomes are possible. A new entry is allocated and inserted into a new structure, a BTB prefetch table. If all entries where the new entry can be inserted are full, a prior entry will be overwritten with the new entry. The new entry will be used to trigger a prefetch of the BTB entry when the same precursor step is found again in the future. Several precursor steps may be present in the trace of recent activities. The distance between the prefetch and its trigger can be dynamically chosen by selecting an earlier item in the trace as the precursor step to adapt to current conditions.

During regular branch prediction operation, the BTB prefetch table is inspected to look for prefetches that need to be triggered. This search is done using current virtual address and branch history register (BHR). On a hit, the corresponding BTB prefetch or prefetches are executed. A target of the improvements is to reduce entry retrievals from either slower BTBs or the BTB victim caches and to prepopulate entries from the slower BTBs or the BTB victim cache in earlier and faster levels before they are needed by the branch prediction pipeline, therefore reducing the latency of future accesses.

An overview of a system with BTB branch prediction is described to provide a general basis of understanding for BTB and operations of some BTB systems. More details describing the use of the trace and BTB prefetch table to prefect BTB entries are provided following the overview.

FIG. 1 illustrates, by way of example, a diagram of an embodiment of a system 100 for branch target prediction. The system 100, as illustrated, comprises components including a program counter 102, a branch history register 104, branch prediction structures 106, branch prediction circuitry 110, a branch prediction queue 112, a compute pipeline 114, data memory 116, program memory 118, a processor 120, and branch resolution circuitry 122.

The program counter 102 identifies an instruction in program memory 118 that is to be executed, such as by an address. The program counter 102 typically increments an instruction counter after providing a value of the instruction counter to prediction structures 106 and branch prediction circuitry 110. The program counter 102 thus typically defaults to a linear, increasing program count. Branch instructions are instructions that may provide a non-linearity to the sequence of instructions executed. Thus, the default operation of the program counter 102, in light of a branch instruction for which a branch is taken, needs to be over-ridden.

The branch history register (BHR) 104 includes data for a specified number of most recent conditional branches executed. The data for a given conditional branch can be a single bit. The bit can be set to "0" if the branch was not taken and "1" if the branch was taken. With each new conditional branch that is encountered in executing the application, the entries of the BHR 104 are shifted to the left and then the outcome of the new branch, as predicted by the branch prediction circuitry 110, is written into the rightmost position of the BHR 104. During the shifting, the bit in the leftmost position of the BHR 104 will be lost. For instance, with a 5-bit BHR and after 5 conditional branches since the start of the processor execution, the BHR 104 may contain the example sequence "10101", indicating that the last conditional branch seen in the program sequence was taken, the previous one was not taken, and so on. If a new conditional branch is seen and determined to be taken, the new BHR 104 contents would be 01011, resulting from the shift to the left of the previous value, losing the leftmost bit and adding a new bit on the right. The size of the BHR 104 is implementation dependent.

The branch prediction structures 106 include branch target buffers (BTBs) 124, 126, 128 that are typically indexed by a subset of the program counter values. For example, a number of least significant bits (LSBs) can be used to index into the BTBs 124, 126, 128. In another example, a same number of contiguous bits that are not the LSBs can be used to index into the BTBs 124, 126, 128. The BTBs 124, 126,

128 include entries that include branch destinations for branches that have historically corresponded to a branch. Thus, each BTB 124, 126, 128 includes a program counter value that has historically been executed immediately after the branch instruction that indexes into the entry.

There are multiple BTBs 124, 126, 128 illustrated in FIG. 1, however, a system may include only a single BTB 124, 126, 128. In systems that include multiple BTBs 124, 126, 128, one of the BTBs is typically stored physically in a memory that is relatively small and close to the prediction circuitry 110, another of the BTBs is stored a little further away or in a memory that is slower to access and has a larger capacity, and yet another of the BTBs is stored even further away or in a memory that is even slower to access and has an even larger capacity. The BTB closest to the prediction circuitry 110 is similar to an L1 cache for a processor in that it provides the fastest access times and has a smallest capacity among the BTBs. The other BTBs may be stored in a different location in the same package.

Other prediction structures 130 can include a direction buffer. The direction buffer can indicate whether the branch jumps to a program counter value less than the present program counter value or greater than the present program counter value. The prediction structures 130 can include data indicating a history of one or more program counter values that lead to the branch or were realized after the branch. Other prediction structures 130 can include a set of arrays accessed with different subsets of PC index and BHR 104. Entries in the other prediction structures 130 can be tagged and provide dynamic taken/not-taken predictions for conditional branches that change dynamically (a conditional branch predictor like a tagged geometric length predictor (TAGE)). The other prediction structures 130 can include dedicated structures that help find out which of the different targets of an indirect predictor is to be followed by a current PC and BHR 104 (indirect predictor, like an indirect target tagged geometric length predictor (ITTAGE)), a loop predictor, a return predictor, and so on.

Instead of waiting for the compute pipeline 114 to indicate a non-linearity to the program counter 102, prediction structures 106 and the branch prediction circuitry 110 can preemptively predict the non-linearity in the program counter 102. The branch prediction circuitry 110 can identify that a branch is likely to be taken and the program counter value associated with the branch. The branch prediction circuitry 110 can provide the program counter value to the program counter 102. The branch prediction circuitry 110 receives the program counter value, contents of the entry of the BTB 124, 126, 128, prediction structures 130, and branch history register 104, and indicator data from the branch prediction queue 112 that indicates whether the branch prediction queue 112 is full or not. The branch prediction circuitry 110 determines a likely next program counter value based on the received data. The branch prediction circuitry 110 can receive the totality of the BHR 104, such as to help determine the final outcome of the branch. The branch prediction circuitry 110 can use information from the BTBs 124, 126, 128, the BHR 104 and all other prediction structures 130 to make a prediction of the final outcome of the branch.

There are many types of branch prediction that can be implemented by the branch prediction circuitry 110. Example types of branch prediction include static techniques, dynamic techniques, history-based prediction, or a combination thereof. Example static techniques include using a heuristic like "assume branches are never taken" or "assume branches are always taken" and providing the program counter value accordingly.

In the case of dynamic branch prediction, the prediction circuitry 110 monitors the actual branch behavior by recording the recent history of each branch. Dynamic branch prediction assumes that the future behavior will continue the same way and make predictions. Examples of dynamic branch prediction techniques include using a 1-bit branch-prediction buffer, 2-bit branch-prediction buffer, a correlating branch prediction buffer, a tournament branch predictor, using an output from a BTB without further processing, a return address predictor, or a combination thereof. These predictors are known, but a short summary of each is provided, not including BTB because that has been explained already.

A 1-bit branch predictor stores 1-bit values to indicate whether the branch is predicted to be taken/not taken. The table can be indexed in the same manner as the BTB 124, 126, 128.

A 2-bit predictor changes prediction only on two successive mispredictions. Two bits are maintained in the prediction buffer and there are four different states. Two states corresponding to a taken state and two corresponding to not taken state. The 2-bit predictor schemes use only the recent behavior of a single branch to predict the future behavior of that branch.

In a correlating branch predictor behavior of one branch is dependent on the behavior of other branches. There is a correlation between different branches. Branch predictors that use the behavior of other branches to make a prediction are called correlating or two-level predictors. These predictors typically make use of global information rather than local behavior information. The information about any number of earlier branches can be maintained in the BHR 104. For example, the prediction circuitry 110 can maintain the information about three earlier branches so that the behavior of the current branch now depends on how these three earlier branches behaved.

A tournament predictor predicts the predictor and attempts to select the right predictor for the right branch. There are two or more different predictors maintained, typically one based on global information and one based on local information, and the choice of the predictor is based on a selection strategy. For example, the local predictor can be used and then every time it commits a mistake, the prediction can be changed to the global predictor. Alternatively, the switch between predictors can be made only when there are two or more successive mispredictions.

Note that in some BTB schemes, there is no 1-cycle penalty for a fastest BTB 124 in calculating the program counter value for a taken branch. A BTB scheme that uses the program counter value from the BTB 124 does not incur this penalty. The BTBs 126, 128 might need more time to provide a result and thus may still incur a penalty of one or more cycles.

Return address predictors predict indirect returns, that is, jumps whose destination address varies at run time. Indirect branches are a type of branch whose target may change when the same branch instruction is seen. Indirect branches can be divided in two classes: returns, and the rest. Both, returns and the rest, may have cases in which their target never changes, and in that situation, both are trivial to predict, and can be predicted by the BTB 124, 126, 128 without the intervention of additional prediction architecture. The situation in which indirect branches are hard to predict is when the target of the indirect branch changes target. Returns are predicted by the return stack buffer 334 and the rest of the hard indirect branches are predicted by an indirect predictor of the other prediction structures 130.

Though procedure returns can be predicted with a BTB, the accuracy of such a prediction technique can be low if the procedure is called from multiple sites and the calls from one site are not clustered in time. To overcome this problem, return address predictors use a small buffer of return addresses operating as a stack in the return stack buffer 334. The return stack buffer 334 (see FIG. 3) caches the most recent return addresses: pushing a return address on the stack at a call and popping one off at a return. If the cache is as large as a maximum call depth it will predict the returns perfectly.

The program counter value from the branch prediction circuitry 110 is entered into the branch prediction queue 112 when the branch prediction queue 112 has sufficient space. The branch prediction queue 112 stores, in a first-in first-out (FIFO) manner, the branches predicted by the branch prediction circuitry 110. The branch prediction queue 112 provides the oldest program counter value it is storing to the compute pipeline 114.

The compute pipeline 114 is a series of stages that operate to provide the processor 120 with an instruction to execute and store results of the execution in the data memory 116. The compute pipeline 114 determines which instruction to fetch from the program memory 118 and provides the instruction, and corresponding data, to the processor 120. The processor 120 executes the instruction and the data memory 116 with the results.

The branch resolution circuitry 122 determines if the branch prediction circuitry 110 generated the same program counter value as the program counter value associated with the instruction that was executed by the processor 120 in executing the branch. The branch resolution circuitry 122 updates the branch history register 104 and the relevant prediction structures 106 if there is a mismatch between the program counter values. Also, if the prediction from the branch prediction circuitry 110 is not correct, the pipeline 114 can stall while re-fetching. There are processors 120 that are smart enough to prevent stalling while re-fetching, allowing instructions that are known correct because they were older than the mispredicted branch (in program order) to be executed while at the same time aborting the execution of instructions that were incorrectly fetched after the branch.

Each of the components of the system 100 is implemented using electric or electronic circuitry. The electric or electronic circuitry can include resistors, transistors, capacitors, inductors, diodes, amplifiers, logic gates (AND, OR, XOR, negate, buffer, or the like), multiplexers, switches, memory devices (e.g., random access memory (RAM) or read only memory (ROM)), processing units (e.g., a central processing unit (CPU), graphics processing unit (GPU), field programmable gate arrays (FPGAs), application specific integrated circuit (ASIC), or the like), power supplies, or the like.

For the branch prediction to be correct, the system 100 needs to correctly guess: whether the program counter value corresponds to a branch, whether the branch is to be taken, and if the branch is to be taken, what is the target program counter.

An optional BTB victim cache may be used to receive BTB entries that are evicted from other BTBs in the system. An evicted entry is one that removed from the BTB because it was not correct, or more commonly because the space it occupies is to be used by another BTB entry that is now in use (a BTB entry that is used more recently than the one being evicted). A BTB entry that is evicted because it has not been recently used and is replaced by another one, may be used again in the future, and thus can be stored for future use.

That the entry was not used for this execution cycle, does not mean that the entry will not be used for a future execution cycle. The location and size of the BTB victim cache can be such that an access to the BTB victim cache is less than the time, energy, or a combination thereof, it takes for an instruction to traverse a compute pipeline, the time it takes for a flush and reset of the compute pipeline, or a combination thereof.

Figure 2:
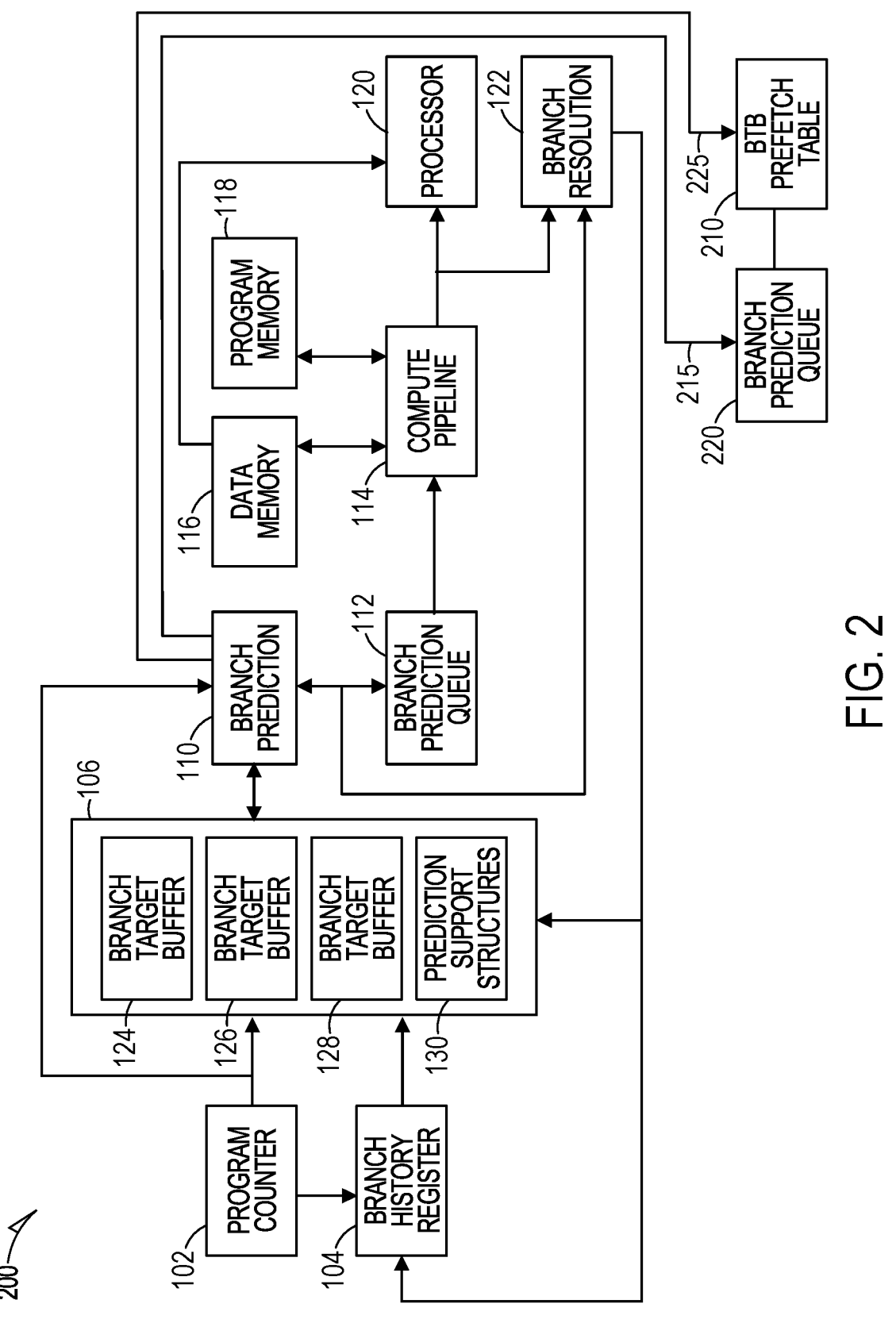
FIG. 2 is a block flow diagram illustrating a system 200 for detecting candidates for prefetching and saving the candidates according to an example embodiment.

FIG. 2 is a block flow diagram illustrating a system 200 for detecting candidates for prefetching and saving the candidates. System 200 illustrates circuits and components utilized in detecting candidates for prefetching and saving the candidates in a BTB prefetch table 210. Like circuits and components are associated with the same reference numbers from FIG. 1.

Branch prediction step details 215 from branch prediction circuitry 110 are accumulated into a branch prediction unit (BPU) trace 220. BPU trace 220 is a buffer which may be part of the prediction support structures 130. BPU trace 220 may be handled as a first-in, first-out (FIFO) memory structure. On a BTB miss 225 determined by branch prediction circuitry 110, a precursor step from the BPU trace 220 is selected as a trigger for future prefetches, and a new entry is allocated in the BTB prefetch table 210.

Figure 3:
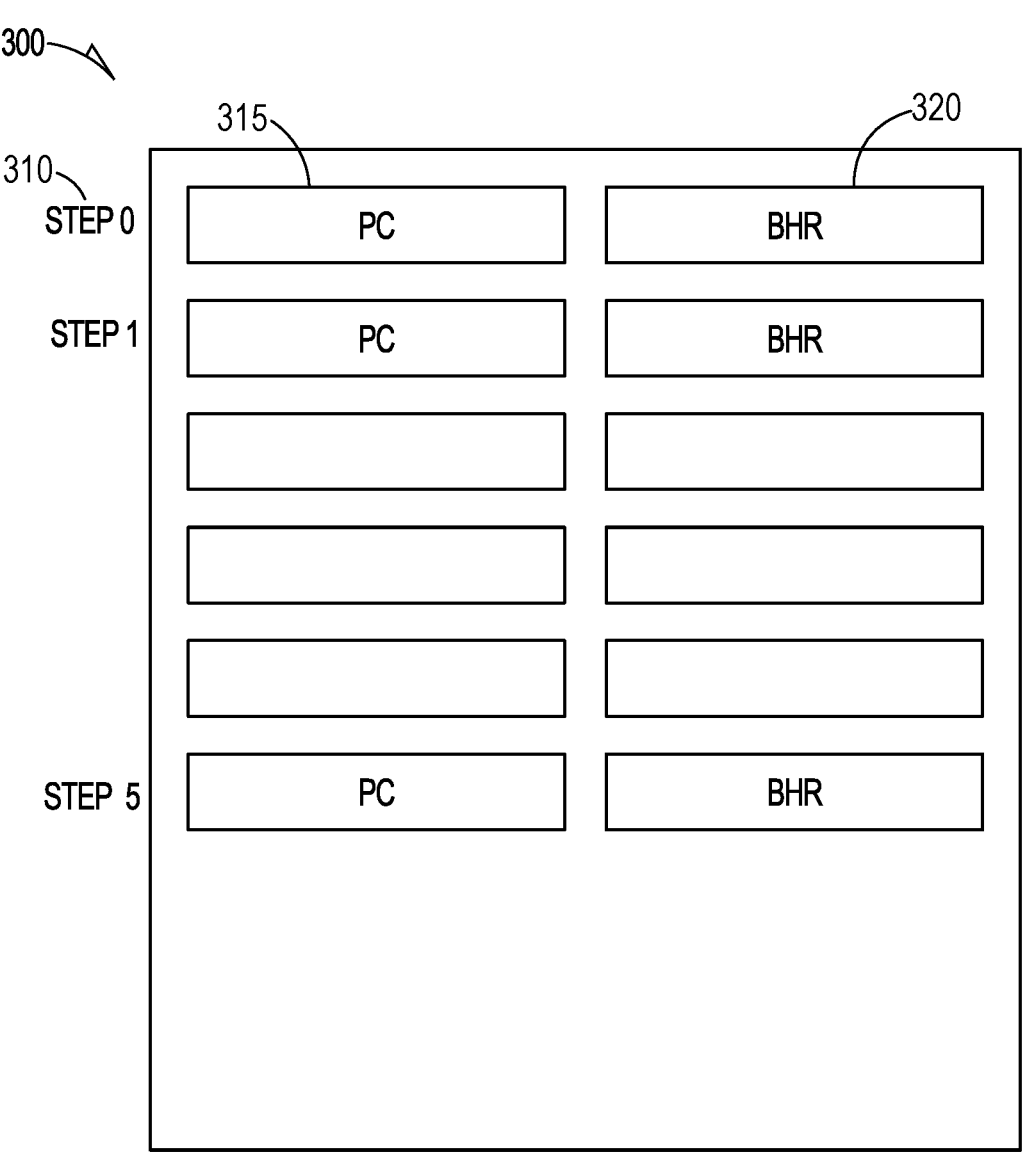
FIG. 3 is a block diagram illustrating a branch prediction unit trace list according to an example embodiment.

FIG. 3 is a block diagram illustrating a BPU trace 300. BPU trace 300 is made of several entries, with each entry holding a single step, such as step 0 at 310. Each step corresponds to one cycle of the branch prediction circuitry. Each entry contains a program counter value 315 and a corresponding BHR entry 320, identifying the step. While steps 0-5 are shown, there may be many more steps in further examples.

Figure 4:
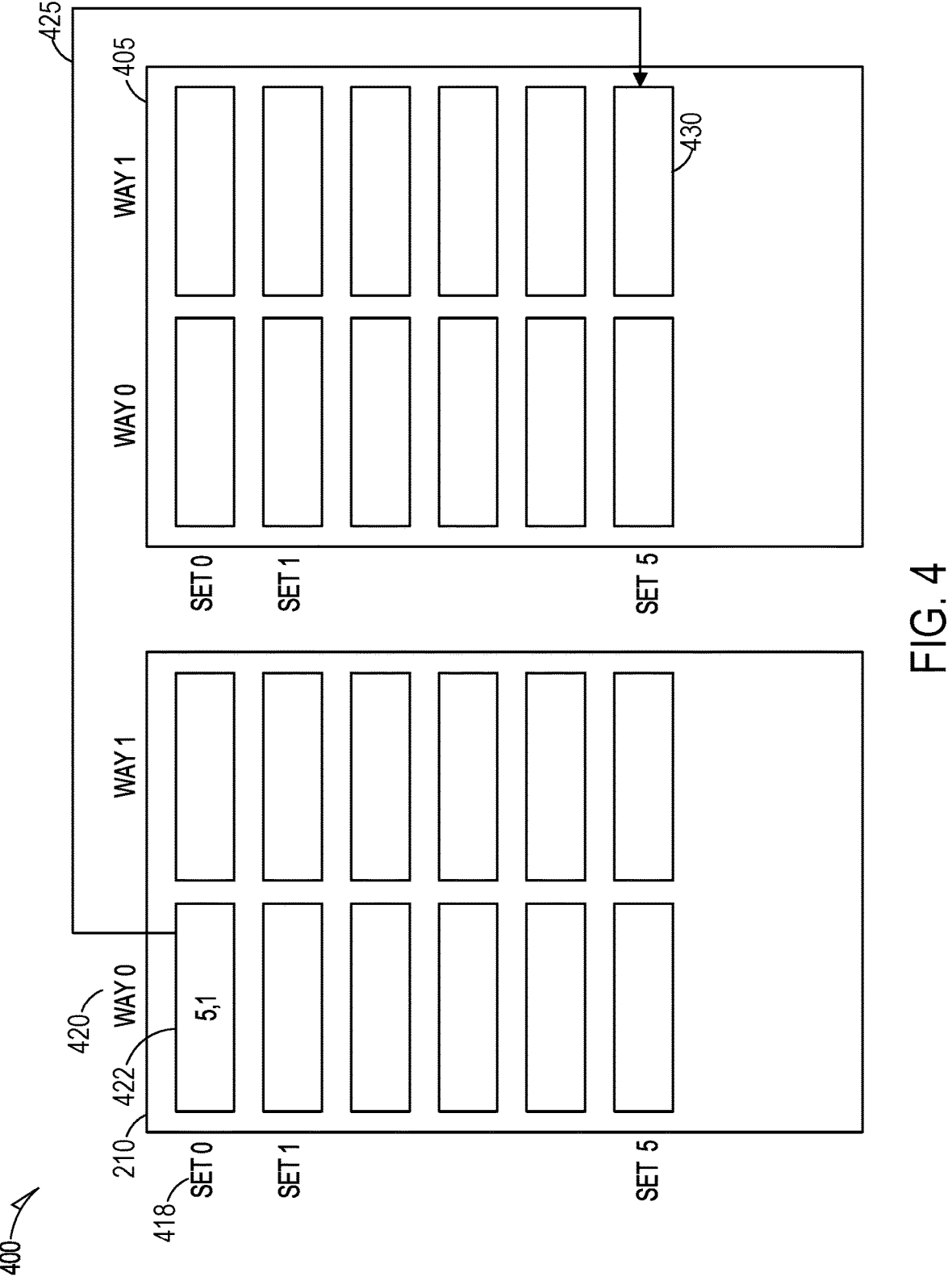
FIG. 4 is a block diagram illustrating a branch target buffer prefetch table having entries that may point to entries in a branch target buffer according to an example embodiment.

FIG. 4 is a block diagram illustrating generally at 400, a BTB prefetch table 210 having entries that may point to entries in a BTB 405. BTB prefetch table 210 is a set-associative table with sets 418 and ways 420, similar to BTBs. Sets 418 and ways 420 may be through of as rows and columns of a table. To reference a particular entry in the BTB prefetch table 210, one need only specify two indices: the index to the set, or row, and the index to the column, or way. BTB prefetch table 210 is indexed using both the program counter value and the BHR entry. Each entry in the BTB prefetch table 210 identifies, as indicated by line 425, one BTB entry 430 to be promoted from the last-level BTB 128 to a previous level BTB or from the victim cache to the last level BTB. A replacement policy may be used to determine promotions in one example based on usefulness.

To identify an entry, the set index and the way index may be used. One bit may be used to differentiate whether the entry is for a last-level BTB entry or a victim cache entry. As shown, set 0, way 0 of the BTB prefetch table 210 has a reference 422 to set 5, way 1, indicated at BTB entry 430 of BTB 405. In further examples, a more general solution is to store the PC value to be used to search a particular entry in the BTB, wherever it is. Using a set and way is cheaper and takes less energy, but is less robust than storing the PC value.

Figure 5:
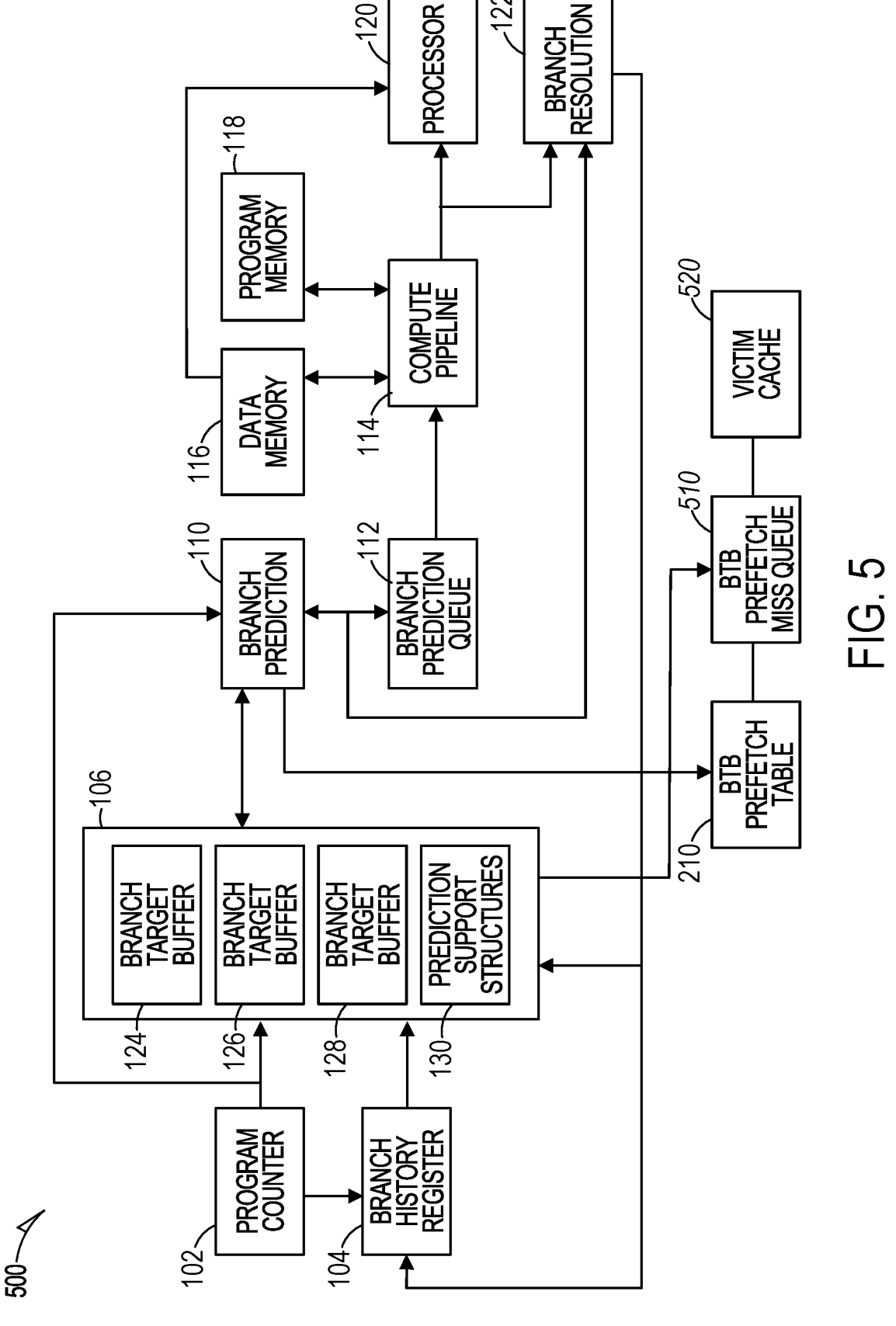
FIG. 5 is a block flow diagram illustrating a system for performing prefetches based on saved candidates according to an example embodiment.

FIG. 5 is a block flow diagram illustrating a system 500 for performing prefetches based on saved candidates. Like components shown in prior figures have the same reference numbers. When a precursor step is accessed again during regular branch prediction circuitry 110 operation, an entry from the BTB prefetch table 210 is used to generate prefetches into a BTB prefetch miss queue 510, which are executed by either promoting entries from larger to smaller BTBs or by bringing BTB entries from a victim cache 520. The use of the victim cache 520 is optional.

The BPU trace 300, will keep a trace of recent branch prediction activity. The trace is split in steps, which each step referring to a regular lookup to BTBs and branch predictors and is implementation dependent. Each step is allocated into one entry of the BPU Trace.

The number of steps to store in the BPU trace 300 is also implementation dependent. The higher the number, the higher the maximum distance between a prefetch and its trigger will be achievable. A higher distance allows hiding a longer latency, which can be the difference in latency between the last BTB level and the previous or between the BTB victim cache 520 and the last level BTB if the optional BTB victim cache is present. The optimal distance to use depends on the latencies to be hidden by the prefetcher and the throughput of the branch predictor pipeline and can be computed using Little's Law. Little's Law is a theorem that determines the average number of items in a stationary queuing system, based on the average waiting time of an item within a system and the average number of items arriving at the system per unit of time. Note that different distances can be used for the two situations of prefetch being described here.

Regardless of the number of steps, each step needs to hold sufficient information to distinguish a particular step from others happening in the prediction engine. This is typically determined by the virtual address (VA) of the current program counter (PC), or block of PCs being considered, as well as the BHR, used to access the different predictors and provide variable prediction results for a given PC/VA.

During regular branch prediction operation, a new case for BTB prefetching will be considered when a lookup of the current VA results in a hit in the last-level BTB and nowhere else. A new case will also be considered if the BTB victim cache 520 is used and a lookup of the current VA results in a miss in all BTB levels but has been annotated as "existing BTB entry" and a request to obtain the entry from the BTB victim cache 520 is started.

One candidate for prefetch is likely to introduce a bubble in the branch prediction pipeline due to the latency required to access the last level BTB or the BTB victim cache 520.

To avoid incurring the same penalty in the future, an entry will be allocated for this BTB entry in the BTB prefetch table 210. The number of entries of the BTB prefetch table 210 is implementation defined.

The BTB prefetch table 210 is a way set-associative structure accessed with a hash of a VA and a BHR 104. The sizes of both are implementation dependent. Several folding operations, or an incremental construction of it, may be required, since the BHR is typically much longer than the VA. Way set-associativity provides a balance between capacity, access time and probability of collisions between different accesses. A replacement policy provides a natural method to maintain the most useful entries in the structure while evicting the entries that are not very useful.

Since the BPU trace 300 has several steps taken by the branch prediction engine to arrive at current VA, multiple steps are available to be used as a trigger to prefetch of current VA in the future.

The trigger used to save the new candidate for prefetch can be chosen dynamically, determined by several parameters and run-time metrics, namely a maximum ancestor distance and a minimum ancestor distance. If the two parameters have different values, the ancestor to use to allocate the new prefetch candidate will be chosen dynamically, using 2 thresholds that can also be specified as parameters.

When the number of non-prefetch BTB misses hitting inflight prefetch BTB accesses in the last N cycles surpasses a programmable threshold, the prefetch distance is increased by one, up to, and including, the maximum specified by the corresponding parameter. N is also dynamically configurable with a control register.

When the number BTB evictions from prefetched-but-not-used entries in the last M cycles surpasses a programmable threshold, the prefetch distance is decreased by one, up to, and including, the minimum specified by the corresponding parameter. M is also dynamically configurable using a control register.

The 4 parameters described above can be implemented as configuration registers, allowing dynamic adjustment to run-time conditions, like the workload being executed or the purpose of the machine in each moment.

If a BTB victim cache 520 is used, it is possible to duplicate the parameters and use them separately for each condition. This allows different distances to be selected for the two situations, which may require different latencies to be hidden.

After a step in the BPU trace 220 is chosen, its VA and BHR entry are used to allocate the BTB entry to be prefetched in the BTB prefetch table 210. If one entry with the same VA and BHR is found, it can be updated with the most recent details. Another VA, this one from the BTB entry that just missed, is stored in the BTB prefetch table 210, and will be used to prefetch it when the BTB entry is visited in the future. In a further example, the index to the set and way of the BTB entry to be promoted in the future may be stored in the BTB prefetch table 210 and used for prefetching.

During normal operation of the branch prediction engine, every VA and BHR used in each step of the prediction can be used to look up in the BTB prefetch table 210. On a hit, the VA or index of the BTB entry to be prefetched, can be used to look up in the last-level BTB or the BTB victim cache 520 to bring the entry closer in the BTB hierarchy.

To bring an entry closer to the BTB hierarchy, the BTB prefetch miss queue 510 will be used. The VA or index of the BTB entry to be prefetched will be inserted in BTB prefetch miss queue 510 entries, whose number is implementation defined.

A finite state machine (FSM) in one example, may be used to opportunistically pick entries from the BTB prefetch miss queue 510 and will initiate the prefetch of the corresponding BTB entries. This operation is specific for each implementation.

Regular BTB lookups missing in the BTBs will scan the BTB prefetch miss queue 510 for presence of the same BTB VAs or indices in them. Each VA or index will be compared with the set+way or VAs that had a hit in the last level BTB but had a mis in the previous level BTBs. On a hit, the counter of non-prefetch BTB misses hitting inflight prefetch BTB accesses will be incremented. This counter is reset every N cycles, dynamically configurable with a control register.

An additional counter may be used to track the number of times a prefetched BTB entry is evicted without being used. This counter is also reset every M cycles, dynamically configurable with a control register. In one example, when an entry is prefetched, a bit is set in the entry indicating the provenance of the entry. The bit is cleared if a regular operation hits in that BTB entry. When one BTB entry is evicted, the bit can be checked to determine the situation in which the entry was prefetched but was not used, that is, with the bit set to 1.

Optionally, a prefetch candidate to be written into several entries in the BTB prefetch table 210 to dynamically find the best trigger for prefetching. To do this, a usefulness counter is added to each BPT entry, initialized to 0. That counter is incremented (up to a maximum value) every time the candidate prefetched using that specific entry was useful to prefetch one BTB entry, which is computed when a subsequent regular lookup hits that BTB entry. If all counters have reached a maximum value, a random entry may be selected for eviction in one example.

To identify the BPT entry that installed one BTB entry, each BTB entry is extended to include an index into the BPT, in the form of set and way. When entries need to be evicted from the BTB prefetch table 210, those with a lower usefulness value will be selected first. Since one candidate is written into several BPT entries, each BPT entry can have room to hold multiple candidates, to minimize destructive collisions. The factor can be the same, i.e.: if each candidate is written in 2 different BPT entries, each BPT entry can have room to hold 2 candidates.

Figure 6:
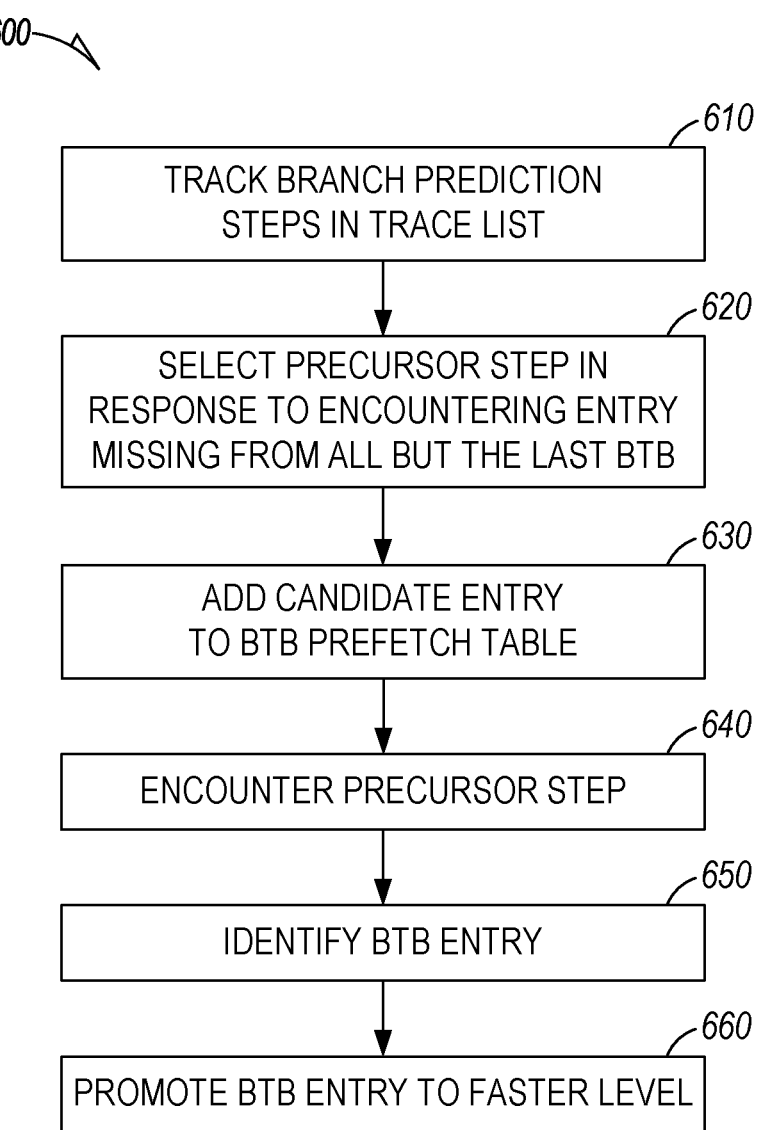
FIG. 6 is a flowchart illustrating a method of managing prefetching of BTB entries according to an example embodiment.

FIG. 6 is a flowchart illustrating a method 600 of managing prefetching of BTB entries according to an example embodiment. Method 600 begins at operation 610 by tracking branch prediction steps in a trace list, each step including a program counter value and a branch history register value. The trace list includes a program counter value and a branch history register entry corresponding to each branch prediction step.

A Precursor step is selected from the trace at operation 620 in response to encountering a first branch target buffer entry that identifies a branch instruction, missing from all but a slowest level of a hierarchy of successively slower to access branch target buffers that store branch target buffer entries. The precursor step is an ancestor of the candidate entry, such that encountering the precursor step acts as a trigger for the candidate entry to be promoted. In one example, the precursor step is selected dynamically as a function of minimum and maximum ancestor distance parameters.

At operation 630, a candidate entry is added to a branch target buffer prefetch table. The candidate entry is accessible based on encountering the precursor step and identifying the first branch target buffer entry.

In one example, method 600 includes encountering an instruction corresponding to the precursor step at operation 640, and identifying, at operation 650, the first branch target buffer entry based on encountering the instruction. The first branch target buffer entry in the branch target buffer is promoted at operation 660 to a faster level.

In one example, method 600 maintains a branch target buffer prefetch miss queue configured to store a program counter value associated with an instruction for which miss indications from each branch target buffer of the branch target buffers is received.

In one example, a prefetch distance is used to identify the precursor step. The prefetch distance has a value bounded by the minimum and maximum ancestor distance parameters.

The prefetch distance may be modified based on a number of non-prefetch branch target buffer misses hitting inflight prefetch branch target buffer accesses in a last N cycles surpassing a programmable threshold. In such instance, the prefetch distance is increased by one, up to, and including, the maximum ancestor distance parameter value.

In response to a number of branch target buffer evictions from prefetched-but-not-used entries in a last M prefetch cycles surpassing a programmable threshold, the prefetch distance is decreased by one, up to, and including, the minimum ancestor distance parameter value.

Figure 7:
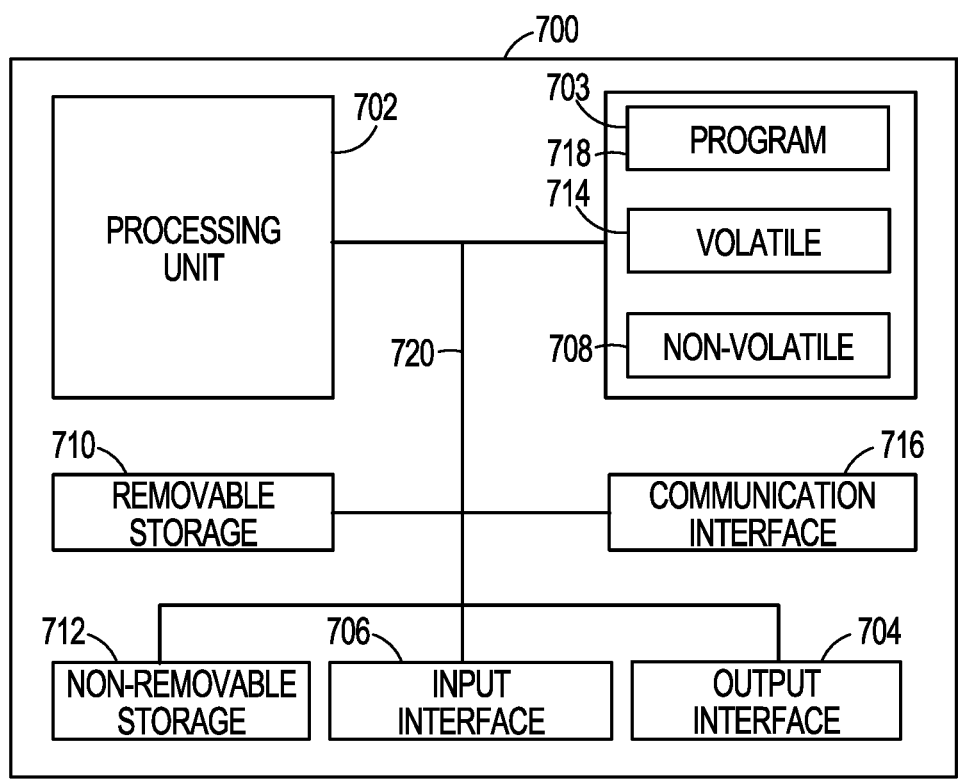
FIG. 7 is a block schematic diagram of a computer system to implement one or more example embodiments.

FIG. 7 is a block schematic diagram of a computer system 700 to perform branch target buffer prefetch operations and for performing methods and algorithms according to example embodiments. All components need not be used in various embodiments. In particular, many of the elements may be implemented at a chip level for performing prefetching.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A branch prediction device includes a hierarchy of successively slower to access branch target buffers that store branch target buffer entries identifying branch instructions, branch prediction circuitry configured to predict future branch instructions, and a branch target buffer prefetch table coupled to receive candidate entries corresponding to predicted future branch instruction branch target buffer misses, each entry of the candidate entries corresponding to a precursor branch instruction, and to receive predicted precursor branch instructions that trigger promotion of an entry in a branch target buffer of the branch target buffers to a faster branch target buffer of the branch target buffers.

2. The device of example 1 wherein the branch prediction circuitry is further configured to promote the entry to the branch target buffer in response to the entry being in a slowest branch target buffer.

3. The device of any of examples 1-2 wherein the branch target buffers further include a victim cache configured to store evicted entries from one or more of the other branch target buffers, wherein the branch prediction circuitry is further configured to promote the entry from the victim cache to one of the other branch target buffers in response to the entry not being in any of the branch target buffers.

4. The device of any of examples 1-3 and further including a trace buffer configured to hold a program counter value and a branch history register entry corresponding to branch prediction circuitry predicted branch instructions.

5. The device of example 4 wherein the branch prediction circuitry is configured to identify the precursor branch instructions as an ancestor of a corresponding candidate, such that encountering an identified precursor branch instruction acts as the trigger for promoting the corresponding candidate.

6. The device of example 5 wherein branch prediction circuitry is configured to select the trigger precursor branch instructions dynamically as a function of minimum and maximum ancestor distance parameters.

7. The device of example 6 and further including a branch target buffer prefetch miss queue configured to store a program counter value associated with an instruction for which miss indications from each branch target buffer of the branch target buffers is received.

8. The device of example 7 wherein a prefetch distance identifying the trigger precursor branch instructions has a value bounded by the minimum and maximum ancestor distance parameters.

9. The device of example 8 wherein a number of non-prefetch branch target buffer misses hitting inflight prefetch branch target buffer accesses in a last N prefetch cycles surpasses a programmable threshold, the prefetch distance is increased by one, up to, and including, the maximum ancestor distance parameter value.

10. The device of example 8 wherein in response to a number of branch target buffer evictions from prefetched-but-not-used entries in a last M prefetch cycles surpassing a programmable threshold, the prefetch distance is decreased by one, up to, and including, the minimum ancestor distance parameter value.

11. A method includes tracking branch prediction steps in a trace list, each step including a program counter value and a branch history register value, selecting a precursor step from the trace in response to encountering a first branch target buffer entry that identifies a branch instruction, missing from all but a slowest level of a hierarchy of successively slower to access branch target buffers that store branch target buffer entries, and adding a candidate entry to a branch target buffer prefetch table, the candidate entry accessible based on encountering the precursor step and identifying the first branch target buffer entry.

12. The method of example 11 and further including encountering an instruction corresponding to the precursor step, identifying the first branch target buffer entry based on encountering the instruction, and promoting the first branch target buffer entry in the branch target buffer to a faster level.

13. The method of any of examples 11-12 wherein the trace list includes a program counter value and a branch history register entry corresponding to each branch prediction step.

14. The method of example 13 wherein the precursor step is an ancestor of the candidate entry, such that encountering the precursor step acts as a trigger for the candidate entry to be promoted.

15. The method of example 14 wherein precursor step is selected dynamically as a function of minimum and maximum ancestor distance parameters.

16. The method of example 15 and further including maintaining a branch target buffer prefetch miss queue configured to store a program counter value associated with an instruction for which miss indications from each branch target buffer of the branch target buffers is received.

17. The method of example 16 wherein a prefetch distance identifying the precursor step has a value bounded by the minimum and maximum ancestor distance parameters.

18. The method of example 17 wherein a number of non-prefetch branch target buffer misses hitting inflight prefetch branch target buffer accesses in a last N prefetch cycles surpasses a programmable threshold, the prefetch distance is increased by one, up to, and including, the maximum ancestor distance parameter value.

19. The method of example 18 wherein in response to a number of branch target buffer evictions from prefetched-but-not-used entries in a last M prefetch cycles surpassing a programmable threshold, the prefetch distance is decreased by one, up to, and including, the minimum ancestor distance parameter value.

20. A device for process branch instruction predictions includes processing circuitry and memory configured to perform a method including tracking branch prediction steps in a trace list, each step including a program counter value and a branch history register value, selecting a precursor step from the trace in response to encountering a first branch target buffer entry that identifies a branch instruction, missing from all but a slowest level of a hierarchy of successively slower to access branch target buffers that store branch target buffer entries, and adding a candidate entry to a branch target buffer prefetch table, the candidate entry accessible based on encountering the precursor step and identifying the first branch target buffer entry.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A branch prediction device comprising:
a hierarchy of successively slower to access branch target buffers that store branch target buffer entries identifying branch instructions;
branch prediction circuitry configured to predict future branch instructions; and
a branch target buffer prefetch table configured to:
in response to a branch instruction missing from a faster level of the branch target buffers, allocate a candidate entry that stores a reference to a branch target buffer entry corresponding to the branch instruction that missed and identifies a precursor branch instruction that precedes the branch instruction that missed in a sequence of branch predictions; and
trigger promotion of the branch target buffer entry from a slower level branch target buffer to a branch target buffer that is faster when the precursor branch instruction is subsequently encountered.

2. The branch prediction device of claim 1 wherein the branch prediction circuitry is further configured to promote the branch target buffer entry to the branch target buffer in response to the branch target buffer entry being in a slowest branch target buffer.

3. The branch prediction device of claim 1 and further comprising a victim cache configured to store evicted entries from one of the branch target buffers, wherein the branch prediction circuitry is further configured to promote the branch target buffer entry from the victim cache to one of the branch target buffers in response to the branch target buffer entry not being in any of the branch target buffers.

4. The branch prediction device of claim 1 and further comprising a trace buffer configured to hold a program counter value and a branch history register entry corresponding to the branch prediction circuitry predicted branch instructions.

5. The branch prediction device of claim 4 wherein the branch prediction circuitry is configured to identify the precursor branch instruction as an ancestor of a corresponding candidate, such that encountering the precursor branch instruction acts as the trigger for promoting the corresponding candidate.

6. The branch prediction device of claim 5 wherein branch prediction circuitry is configured to select the precursor branch instruction dynamically as a function of minimum and maximum ancestor distance parameters.

7. The branch prediction device of claim 6 and further comprising a branch target buffer prefetch miss queue configured to store a program counter value associated with an instruction for which miss indications from each branch target buffer of the branch target buffers is received.

8. The branch prediction device of claim 7 wherein a prefetch distance identifying the precursor branch instruction has a value bounded by the minimum and maximum ancestor distance parameters.

9. The branch prediction device of claim 8 wherein a number of non-prefetch branch target buffer misses hitting inflight prefetch branch target buffer accesses in a last N prefetch cycles surpasses a programmable threshold, the prefetch distance is increased by one, up to, and including, the maximum ancestor distance parameter value.

10. The branch prediction device of claim 8 wherein in response to a number of branch target buffer evictions from prefetched-but-not-used entries in a last M prefetch cycles surpassing a programmable threshold, the prefetch distance is decreased by one, up to, and including, the minimum ancestor distance parameter value.

* * * * *